(No Model.) 2 Sheets—Sheet 1.
A. J. MOYER.
LAWN MOWER.
No. 392,282. Patented Nov. 6, 1888.
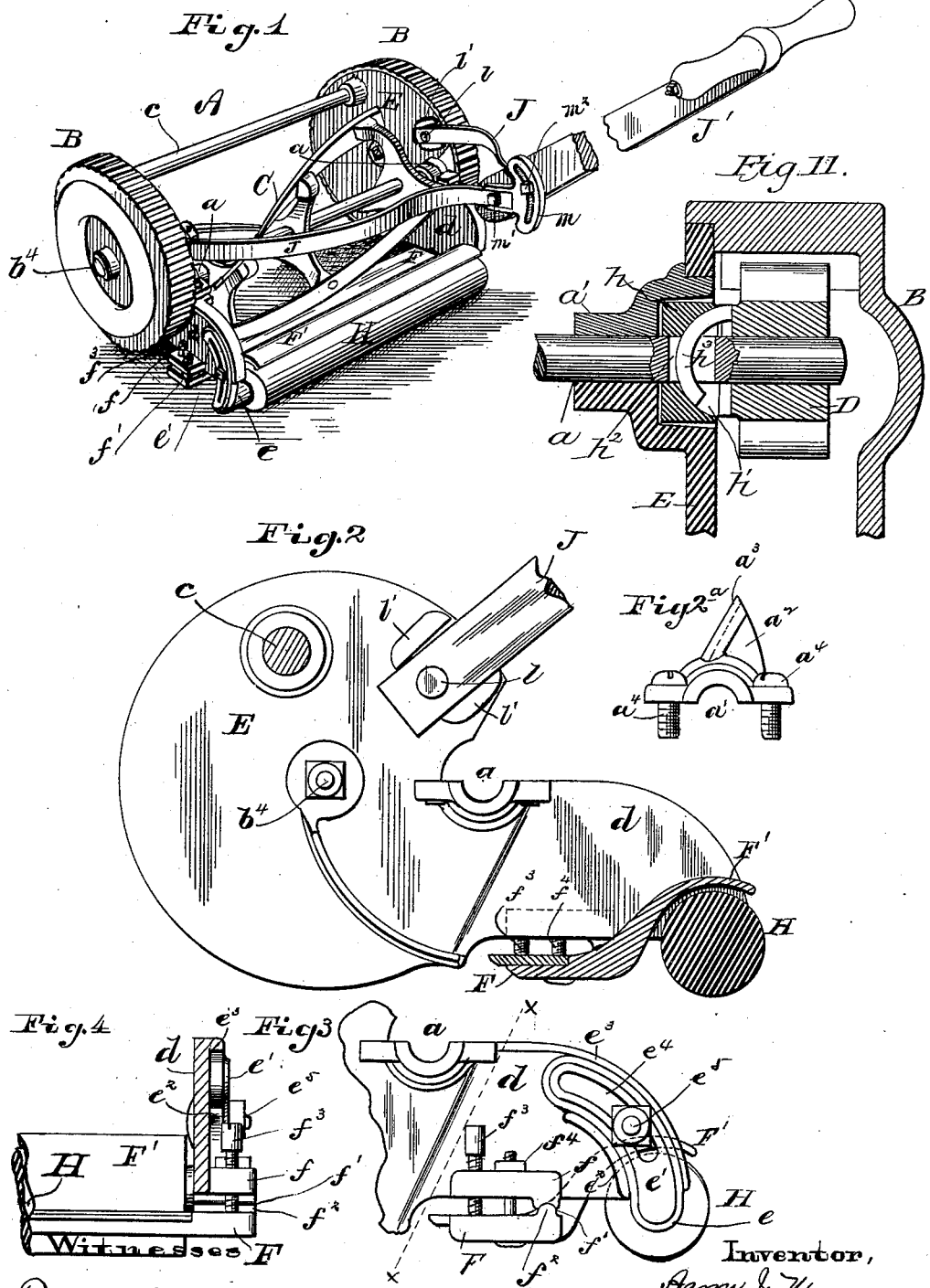
Witnesses
P. A. Clevenger
E. W. McMillen
Inventor,
Aaron J. Moyer,
By (No Model.) 2 Sheets—Sheet 2.
A. J. MOYER.
LAWN MOWER.
No. 392,282. Patented Nov. 6, 1888.
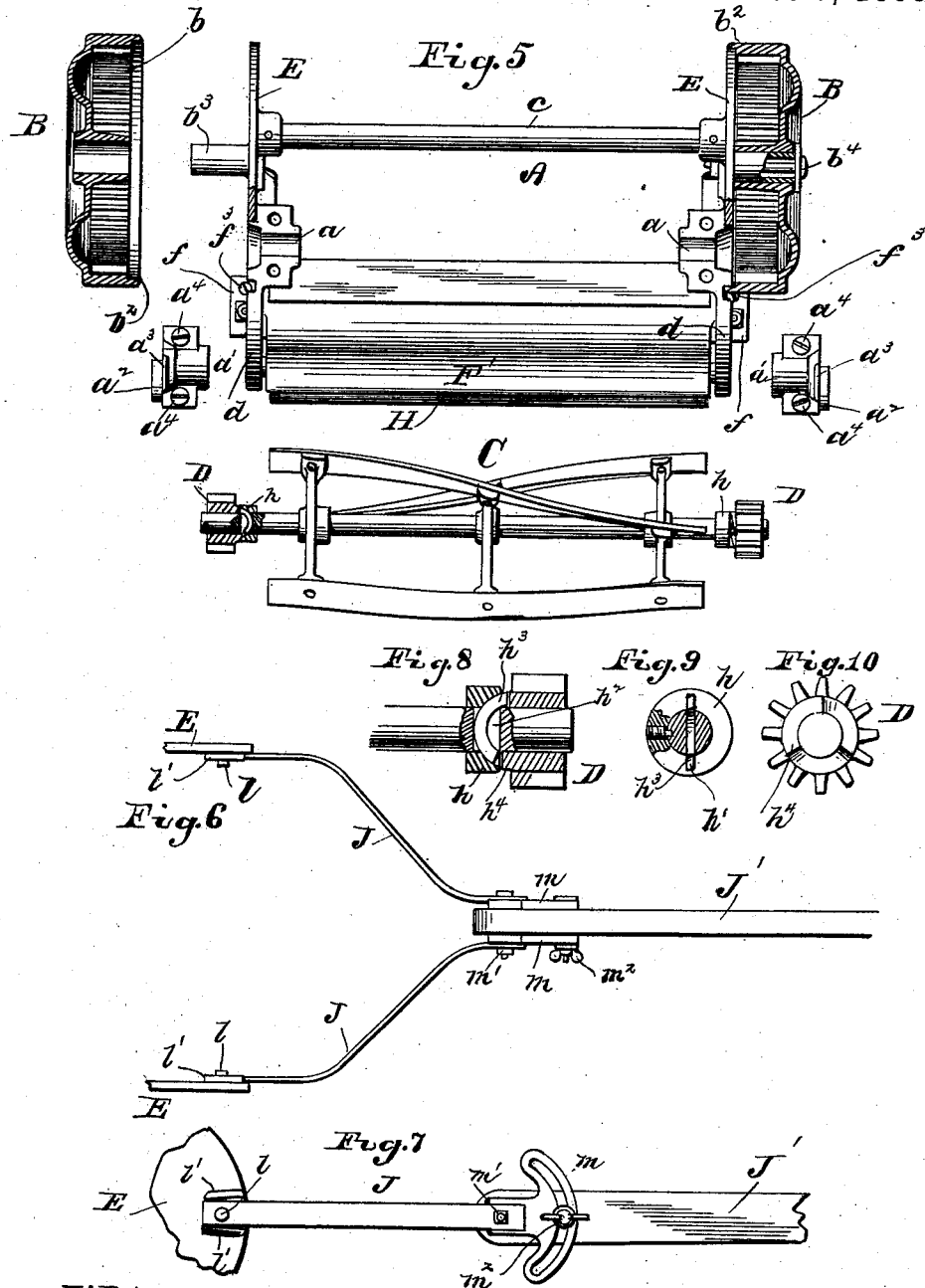
Witnesses
P. J. Clevenger.
E. W. McMillen.
Inventor,
Aaron J. Moyer,

UNITED STATES PATENT OFFICE.

AARON J. MOYER, OF SPRINGFIELD, OHIO.

LAWN-MOWER.

SPECIFICATION forming part of Letters Patent No. 392,282, dated November 6, 1888.

Application filed September 20, 1886. Serial No. 214,067. (No model.)

*To all whom it may concern:*

Be it known that I, AARON J. MOYER, a citizen of the United States, residing at Springfield, in the county of Clark and State of Ohio, have invented certain new and useful Improvements in Lawn-Mowers, of which the following is a specification.

My invention relates to improvements in lawn-mowers.

The object of my invention is to provide a lawn-mower simple in construction, adapted to be readily adjusted, and capable of easy operation.

My invention consists in various constructions and combinations of parts, hereinafter described, and pointed out in the claims.

In the accompanying drawings, Figure 1 is a perspective view of a lawn-mower embodying my invention. Fig. 2 is a transverse sectional view of the same with the reel removed, the detachable portions of the boxes for securing the cutting-reel in place being shown in Fig. 2$^a$. Fig. 3 is a partial end view of the main frame, showing a method of adjusting the cutter-bar and the rear supporting-roller. Fig. 4 is a sectional view of the same, taken on the line $x\,x$ in Fig. 3. Fig. 5, A, B, and C is a plan view of the mower with the operating parts removed from the main frame, some of the parts being shown in section. Figs. 6 and 7 are respectively a plan and elevation of the handle and attachments, showing the method of adjusting the same. Figs. 8, 9, 10, and 11 are detailed sectional views of the reel-shaft and driving-pinion, showing the clutch mechanism for driving the reel.

Like parts are indicated by similar letters of reference throughout the several views.

In the said drawings, A represents the main frame on which the various operating parts are supported.

B B are driving and carrying wheels located at either end of the main frame, and adapted to support the same and furnish the power for driving the cutting-reel.

C is the cutting-reel, journaled at either end in suitable bearings, $a$, and provided with pinions D D, adapted to be engaged by the internal gears, $b\,b$, on the driving-wheels B B.

The main frame consists at either end of circular disks E E, connected together at the top by a connecting-rod, $c$, and at the bottom by a cutter-bar, F. Each of the disks E is provided with a backwardly-extending wing or flange, $d$, which is offset slightly from the disk E, and adapted to support the cutter-bar and attachments, as hereinafter described.

The driving-wheels are each turned in at $b^2$, as shown in Fig. 5, and adapted to project over the periphery of and inclose the end disks, E. The said driving-wheels are each journaled on a hollow spindle, $b^3$, in the center of said disks, and held thereon by a bolt, $b^4$, which passes through said spindle and is provided with a suitable retaining-nut. The cutting-reel C is adapted to rotate above the cutter-bar F. The pinions D D, from which it receives its motion from the driving-wheels, are on the outer sides of the end disks, E, and when ready for operation are completely inclosed by said driving-wheels B B.

In order to provide for readily removing the cutting-reel, and at the same time have the pinions completely inclosed between the driving-wheels and the end disks, I form the reel-bearings $a$ in the said end disks with open boxes, the upper part of each of said boxes being formed with a wing on the arc of a circle, adapted when inserted in place to form a portion of and complete the circularity of the disks. The boxes, with their bearings $a\,a$, are projected inwardly from the disks E, and the lower portions of said boxes are formed by cutting away a portion of said disks sufficiently to permit the reel-shaft to be readily removed from and inserted into said boxes. The box proper is formed in two parts, the upper part, $a'$, being provided with a wing, $a^2$, adapted to fit into and close the opening in the disk E, and thus complete the circularity of said disk. A small flange, $a^3$, is preferably provided on the wing $a^2$, adapted to rest against the disks E and form a stop for locating the upper portions, $a'$, of the boxes in their proper places. The boxes are held together by screws or bolts $a^4$, which may be readily removed, when desired, for removing the reel. It will be seen that by this construction, when ready for operation, the pinions and driving-gears are completely inclosed between the driving-wheels and the end frame-disks, but that the cutting-reel may be readily removed without detaching its driving-pinions, and without removing the end disks, by simply removing the driving-wheels and opening the boxes having the bearings $a\ a$.

Immediately in the rear of the cutter-bar and supported at either end by the backwardly-extending wings $d$, I provide a roller, H, formed preferably of wood and supported at either end in the adjustable bearings $e$. The bearings $e$ are each provided with an upwardly-projecting extension, $e'$, formed on the arc of a circle and adapted to fit between projecting guides $e^2\ e^3$ on the wings $d$, a slotted opening, $e^4$, being provided in said extension, through which is projected a bolt, $e^5$, adapted to secure the bearings $e$ in different positions of adjustment. The roller H, thus connected, is adapted to support the rear portion of the mower and furnish the means for adjusting the cutter-bar at different heights for cutting the grass long or short, as desired.

Immediately in front of the roller H the wings $d$ are provided with outwardly-projecting lugs $f$, each formed at the rear with a small concave bearing, $f'$, adapted to receive a rounded projection, $f^2$, on the projecting end of the cutter-bar F. At the forward side of the projecting lug $f$ is a set-screw, $f^3$, extending through said lug and adapted to bear at its lower end against the projecting end of the cutter-bar.

Immediately back of the set-screw $f^3$ is a clamping-bolt, $f^4$, which passes through the projecting end of the cutter-bar and its supporting-lug, and draws the said cutter-bar against the bearing $f'$ and set-screw $f^3$. By this construction it will be seen that means are provided for readily adjusting the cutter-bar to or from the cutting-reel by loosening the set-screw $f^3$ and tightening the clamping-bolt $f^4$, or vice versa.

To prevent the cut grass from becoming entangled with the roller H, I provide a projecting cover or shield, F', cast in a single piece with the cutter-bar F, and curved upwardly and backwardly between the wings or flanges $d\ d$, and adapted to conform to the shape of and cover the said roller H.

The cutter-bar F, with the cover or shield F', is preferably formed of cast-iron, the front edge thereof being lined with a plate of steel, to form the cutting-edge, the shape of the bar being such that the cut grass will be swept up by the reel and over the top of the cover or shield F' without coming in contact with the roller H.

In order that the cutting-reel may be driven when the mower is run in a forward direction only and remain at rest when moved in a backward direction, the pinions D D are placed loosely on the reel-shaft, and a clutch mechanism provided adapted to engage the said pinions, and thus revolve the shaft when the pinion is turned in a forward direction, and adapted to be disengaged therefrom and permit the pinion to turn freely on the shaft when revolved in the opposite direction. This clutch I form as follows: Secured rigidly to the shaft, at the inner side of the pinions D D, is a collar, $h$, provided on one side with a transverse slot, $h'$, having a concave bottom. In the shaft immediately opposite the concaved slot is a mortise, $h^2$, which extends directly through the shaft in a line with and adapted to form a continuation of the slot $h'$. Located in the slot $h'$, and extending through the mortise $h^2$ in the shaft, is a curved pawl, $h^3$, adapted to fit in said slot $h'$ and oscillate on the curved bottom thereof, the latter forming a bearing for the pawl. On the hub of each pinion D D, next to the collar $h$, is formed a series of ratchet teeth or notches, $h^4$. The pawl $h^3$ is made of such length that one end always projects beyond the face of the collar sufficiently to engage the ratchet-teeth on the pinion when the other end is depressed sufficiently to permit the ratchet-teeth to pass over the same. It will be seen that by this construction a positive clutch is formed, since the backward revolution of the pinion past the projecting end of the pawl forces the opposite end of the pawl in engagement with the ratchet-teeth on the opposite side of the pinion, one end of the pawl being thus always sufficiently projected to engage the pinion when turned in a forward direction.

The handle by which the machine is propelled is attached directly to the end disks, E E. For this purpose small projecting studs $l$ are cast on the inner sides of said disks, on which are journaled the side pieces, J, of the bail, to which the handle proper, J', is secured. On either side of each projecting stud $l$ are small projecting lugs $l'$, between which the ends of the bail-pieces J are adapted to rest, the said bail-pieces being capable of a limited motion about the stud and between the said lugs.

In order that the handle may be adjusted to different heights in relation to the mower-frame, I provide a pivoted connection between the bail-pieces J J and the handle proper, J', and furnish means for holding the handle J' in different positions of adjustment in relation to said bail. This I accomplish by securing the rear end of each of the bail-pieces to a slotted sector, $m$, adapted to rest on either side of the handle proper, and be secured thereto in different positions by a retaining-bolt, $m'$, which passes through said handle and the slotted openings in said sectors. The bolt $m'$, which passes through the rear ends of the bail-pieces, the sectors, and handle, forms a pivoted connection between the said handle and the bail, upon which the handle may be turned, as desired, (within the limits of the slotted openings,) between the sectors $m$, a thumb-nut, $m^2$, being provided for loosening or tightening the said sectors against the handle, and thus holding the said handle in different positions of adjustment, as desired.

Having thus described my invention, I claim—

1. The combination, with a reel-shaft having a mortise therein, a rigid collar at the end thereof overlying said mortise, and a curved sliding pawl extending through the mortise and adapted to slide on a bearing in said collar, of a pinion provided with ratchet-teeth adapted to engage said pawl, an end disk provided with a bearing-box having a detachable portion for said shaft, and a driving-wheel adapted to engage with said pinion and project over said end disk, and thus inclose said pinion and collar, substantially as set forth.

2. The combination, with the reel-shaft having a collar thereon, said collar being provided with a transverse slot having a curved bottom extending across the face thereof, and a mortise through said shaft in a line with and adapted to form a continuation of said slot, of a wheel on said shaft provided with ratchet-teeth adjacent to the slotted face of said collar, and a curved pawl adapted to slide on the concaved bottom of said slot and engage at either end with the ratchet-teeth in said wheel when turned in one direction only, substantially as set forth.

3. The combination, with the end disks, E, having projecting studs $l$ and stop-lugs $l'$, the bail-pieces J, pivoted on said projecting studs and capable of a limited motion thereon between the said stop-lugs, and the slotted sectors $m$ on the rear ends of said bail-pieces, of the handle J' and the pivot-bolt $m'$ and the clamping-bolt $m^2$, substantially as and for the purpose set forth.

In testimony whereof I have hereunto set my hand this 15th day of September, A. D. 1886.

AARON J. MOYER.

Witnesses:
CHASE STEWART,
PAUL A. STALEY.